(12) United States Patent
Wang et al.

(10) Patent No.: US 11,466,148 B2
(45) Date of Patent: Oct. 11, 2022

(54) SOFT POLYPROPYLENE COMPOSITION WITH IMPROVED OPTICAL BEHAVIOR

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 17/594,555

(22) PCT Filed: Apr. 28, 2020

(86) PCT No.: PCT/EP2020/061658
§ 371 (c)(1),
(2) Date: Oct. 22, 2021

(87) PCT Pub. No.: WO2020/221706
PCT Pub. Date: Nov. 5, 2020

(65) Prior Publication Data
US 2022/0145056 A1     May 12, 2022

(30) Foreign Application Priority Data
Apr. 29, 2019   (EP) .................................. 19171591

(51) Int. Cl.
*C08L 23/14*   (2006.01)
*C08L 53/02*   (2006.01)

(52) U.S. Cl.
CPC ............. *C08L 23/142* (2013.01); *C08L 53/02* (2013.01); *C08L 2205/025* (2013.01); *C08L 2205/03* (2013.01); *C08L 2207/02* (2013.01)

(58) Field of Classification Search
CPC ...... C08L 23/142; C08L 53/02; C08L 53/025; C08L 2205/025; C08L 2205/03; C08L 2207/02
See application file for complete search history.

(56) References Cited

U.S. PATENT DOCUMENTS

| 2011/0129627 | A1* | 6/2011 | Schedenig | ............ | C08L 51/006 525/89 |
| 2014/0039124 | A1* | 2/2014 | Reichelt | ............... | C09D 123/14 525/240 |

FOREIGN PATENT DOCUMENTS

| EP | 0887379 A1 | 12/1998 |
| EP | 3064548 A1 | 9/2016 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2002002576 A1 | 1/2002 |
| WO | 2004000899 A1 | 12/2003 |
| WO | 2004111095 A1 | 12/2004 |
| WO | 2007116034 A1 | 10/2007 |
| WO | 2011076780 A1 | 6/2011 |
| WO | 2011135004 A2 | 11/2011 |
| WO | 2012001052 A2 | 1/2012 |
| WO | 2012084961 A1 | 6/2012 |
| WO | 2013007650 A1 | 1/2013 |
| WO | 2015011135 A1 | 1/2015 |
| WO | 2015158790 A2 | 10/2015 |
| WO | 2018185024 A1 | 10/2018 |

OTHER PUBLICATIONS

International Search Report and Written Opinion for the International Search Authority for PCT/EP2020/061658, dated Jul. 1, 2020, 11 pages.
International Preliminary Report on Patentability for PCT/EP2020/06158 dated Mar. 11, 2021, 10 pages.
Extended European Search Report for EP19171591.1 dated Oct. 8, 2019, 6 pages.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Castignolles, et al., "Detection and Quantification of Branching in Polyacrylates by Size-Chromatography (SEC) and Melt-State 13c NMR Specroscopy," Polymer 50, 2009, pp. 2373-2383.
Cheng, H.N., "C NMR Analysis of Ethylene-Propylene Rubbers," Macromolecules, 1984, vol. 17, 1984, pp. 1950-1955.
Filip, et al., "Heteronuclear decoupling under fast MAS by a rotor-synchronized Hahn-echo pulse train," Journal of Magnetic Resonance, vol. 176, 2005, pp. 239-243.
Griffin, et al., "Low-load Rotor-Synchronised Hahn-echo Pulso Train (RS-HEPT) 1H Decoupling in Solid-State NMR: factors affecting MAS Spin-echo Dephasing Times", Magnetic Resonance in Chemistry, 2007; 45: S198-S208, Published online in Wiley Interscience.
Zweifel, et al., "Plastic Additives Handbook", 6th edition, Hanser Publications, 2009 pp. 1141 to 1190.
Klimke, et al., "Optimisation and Application of Polyolefin Branch Quantification by Melt-State 13C NMR Spectroscopy," Macromolecular Chemistry and Physics, vol. 207, 2006, pp. 382-395.
Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.
Resconi, et al., "Selectivity in Propene Polymerization with Metallocene Catalysts," Chem. Rev., 2000, vol. 100, pp. 1253-1345.

(Continued)

*Primary Examiner* — Jeffrey C Mullis
(74) *Attorney, Agent, or Firm* — Lowenstein Sandler LLP

(57) ABSTRACT

The present invention is directed to a polyolefin composition (C) containing a heterophasic propylene copolymer (TERHECO) and a styrenic thermoplastic (sTPE), wherein the heterophasic propylene copolymer (TERHECO) consists of units derived from propylene, ethylene and 1-hexene. Further the present invention is directed to articles made from the polyolefin composition (C) as well as to the production of sterilized articles.

16 Claims, No Drawings

(56) References Cited

OTHER PUBLICATIONS

Singh, et al., "Triad Sequence Determination of Ethylene-Propylene Copolymers—Application of Quantitative 13C NMR," Polymer Testing, 2009, vol. 29, pp. 475-479.

Wang, et al., "Structural Analysis of Ethylene/Propylene Copolymers Synthesized with a Constrained Geometry Catalyst," Macromolecules, 2000, vol. 33, pp. 1157-1162.

Zhou, et al., "A new decoupling method for accurate quantification of polyethylene copolymer composition and triad sequence distribution with 13C NMR," Journal of Magnetic Resonance, vol. 187, 2007, pp. 225-233.

Alma et al., Crystallization Rates of Matched Fractions of MgCl2-Supported Ziegler Natta and Metallocene Isotactic Poly(propylene)s. 1. The Role of Chain Microstructure, Macromolecules 2003, 36, pp. 1559-15781.

Nello Pasquini, "Metallocene Catalysts for Propylene Polymerization", Polypropylene Handbook, 2nd Edition, Hanser Publishers, 3 pages.

\* cited by examiner

SOFT POLYPROPYLENE COMPOSITION WITH IMPROVED OPTICAL BEHAVIOR

CROSS REFERENCE TO RELATED APPLICATION(S)

The present application is a national stage entry under 35 U.S.C. § 371 of International Application No. PCT/EP2020/061658 filed on Apr. 28, 2020, which claims priority to EP Application No. 19171591.1 filed on Apr. 29, 2019.

FIELD OF INVENTION

The present invention is directed to a polyolefin composition (C) containing a heterophasic propylene copolymer (TERHECO) and a styrenic thermoplastic (sTPE), wherein the heterophasic propylene copolymer (TERHECO) consists of units derived from propylene, ethylene and 1-hexene. Further the present invention is directed to articles made from the polyolefin composition (C) as well as to the production of sterilized articles.

BACKGROUND

There is an increasing trend in the medical packaging industry to use plastic containers, notably pouches or closed bags containing sterilized liquids or gels, like infusion solutions. Retort pouches or closed bags offer many advantages over rigid metal packages such as faster sterilizing time, less shelf storage space and easier disposal. In medical application the polymer should be sufficient stiffness as well as having high impact strength. In the case of medical applications, softness rather than stiffness is a key-requirement. Of course also these polymers must withstand sterilization conditions and should provide good optical properties even after sterilization.

It is known that impact strength of polypropylene can be improved by dispersing a rubber phase within the polymer matrix, thereby obtaining a heterophasic polypropylene composition. Such a material is also called "impact-modified polypropylene".

As discussed above, it is known that heterophasic propylene polymers (impact-modified propylene polymers) provide high impact strength if the amount of rubber dispersed within the matrix is sufficiently high, e.g. in stand-up pouches typically at least 10 wt % or even at least 15 wt %.

As mentioned above, for some food packaging applications such as retort pouches or some medical packaging applications, a sterilization treatment is needed. The most common sterilization procedures are the use of heat (steam), radiation (beta radiation, electrons, or gamma radiation) or chemicals (usually ethylene oxide). Steam sterilisation is usually carried out in a temperature range of about 120 to 130° C. Of course, treatment of a polymer under the sterilization conditions outlined above can impair its final properties.

However, it has turned out that standard heterophasic systems change significantly their properties after sterilization. Typically the optical properties as well as the mechanical properties are undesirable impaired.

Considering the drawbacks outlined above, it is an object of the present invention to provide a polymer composition which is soft, though and has good optical properties. Preferably these properties remain on a high level after sterilization treatment. A further object is that the properties of softness, toughness and good optical appearance are also observed at films made from the polymer composition before and after sterilization.

The object of the present invention is to provide a polyolefin composition suitable for the healthcare area, i.e. suitable for the production of bags which have after sterilization good mechanical and optical properties. That is the object of the present invention is to provide a polyolefin composition being soft, transparent and tough even after sterilization.

SUMMARY OF THE PRESENT INVENTION

The finding of the present invention is to provide a polyolefin composition based on a heterophasic propylene copolymer (TERHECO) and a styrenic thermoplastic (sTPE), wherein the heterophasic propylene copolymer (TERHECO) consists of units derived from propylene, ethylene and 1-hexene.

Accordingly the present invention is directed to a polyolefin composition (C) comprising
(a) a heterophasic propylene copolymer (TERHECO) comprising
 (a1) a matrix (M) being a crystalline propylene copolymer (PP) and
 (a2) an elastomeric propylene copolymer (EC) dispersed in said matrix (M), the heterophasic propylene copolymer (TERHECO) consists of units derived from propylene and ethylene,
and
(b) a styrenic thermoplastic elastomer (sTPE),
wherein
(i) the weight ratio between the heterophasic propylene copolymer (TERHECO) and the styrenic thermoplastic elastomer (sTPE) [(TERHECO)/(sTPE)] is in the range of 30/70 to 90/10
(ii) the overall weight of the heterophasic propylene copolymer (TERHECO) and the styrenic thermoplastic elastomer (sTPE) based on the weight of the composition (C) [((TERHECO)+(sTPE))/(C)] is at least 80 wt.-%,
wherein further
(iii) the 1-hexene content, based on the weight of the heterophasic propylene copolymer (TERHECO), is in the range of 1.0 to 12.0 wt.-%,
(iv) the ethylene content, based on the weight of the heterophasic propylene copolymer (TERHECO), is in the range of 0.1 to 12.0 wt.-%, preferably in the range of 0.1 to 6.0 wt.-%,
wherein still further
(v) the xylene cold soluble fraction (XCS) of the heterophasic propylene copolymer (TERHECO) is in the range of 12 to 45 wt.-%, preferably in the range of 12 to 40 wt.-%.

Preferred embodiments of the polyolefin composition (C) are defined in the dependent claims.

The invention is further directed to articles, preferably to packaging material, like a pouch or a (infusion or blood) bag comprising the polyolefin composition (C) according to this invention.

Finally the invention is also directed to a process for producing a sterilized article comprising the steps of (a) producing the article containing at least 90 wt.-% of the polyolefin composition (C) according to this invention and (b) sterilizing this article.

In the following, the present invention is described in more detail.

DETAILED DESCRIPTION OF THE PRESECTION INVENTION

The Polyolefin Composition (C)

As indicated above, the inventive polyolefin composition (C) comprises a heterophasic propylene copolymer (TERHECO) and a styrenic thermoplastic elastomer (sTPE).

The weight ratio between the heterophasic propylene copolymer (TERHECO) and the styrenic thermoplastic elastomer (sTPE) [(TERHECO)/(sTPE)] is in the range of 30/70 to 90/10, preferably in the range of 40/60 to 85/15, more preferably in the range of 45/55 to 80/20, like in the range of 50/50 to 75/25.

The overall weight of the heterophasic propylene copolymer (TERHECO) and the styrenic thermoplastic elastomer (sTPE) based on the weight of the composition (C) [((TERHECO)+(sTPE))/(C)] is at least 80 wt.-%, preferably at least 90 wt.-%, more preferably at least 95 wt.-%, still more preferably at least 97 wt.-%, like at least 99 wt.-%. It is especially preferred that the polyolefin composition (C) consists of the heterophasic propylene copolymer (TERHECO), the styrenic thermoplastic elastomer (sTPE) and optionally additives (AD) as outlined in more detail below.

Preferably, the polyolefin composition (C) according to the present invention comprises i) at least 30 wt.-%, more preferably 30 to 90 wt.-%, still more preferably 40 to 85 wt.-%, yet more preferably 45 to 80 wt.-%, like 50 to 75 wt.-%, of the heterophasic propylene copolymer (TERHECO), and ii) at least 10 wt.-%, more preferably 10 to 70 wt.-%, still more preferably 15 to 60 wt.-%, yet more preferably 20 to 55 wt.-%, like 25 to 50 wt.-%, of the styrenic thermoplastic elastomer (sTPE), based on the overall weight of the polyolefin composition (C).

The polyolefin composition (C) according to the present invention may comprise additives (AD).

Accordingly, it is preferred that the inventive polyolefin composition (C) comprises, more preferably consists of, i) at least 30 wt.-%, more preferably 25 to 98.999 wt.-%, still more preferably 36.5 to 84.99 wt.-%, yet more preferably 42.8 to 79.9 wt.-%, like 48 to 73 wt.-%, of the heterophasic propylene copolymer (TERHECO), ii) at least 10 wt.-%, more preferably 10 to 70 wt.-%, still more preferably 15 to 60 wt.-%, yet more preferably 20 to 55 wt.-%, like 25 to 50 wt.-%, of the styrenic thermoplastic elastomer (sTPE), and iii) optionally 0.001 to 5.0 wt.-%, more preferably 0.01 to 3.5 wt.-%, still more preferably 0.1 to 2.2 wt.-%, like 1.0 to 2.0 wt.-% of additives (AD), based on the overall weight of the polyolefin composition (C).

The additives (AD) are described in more detail below. Any polymer being a carrier material for additives (AD) is not calculated to the amount of polymeric compounds as indicated in the present invention, but to the amount of the respective additive as outlined in more detail below.

It is preferred that the polyolefin composition (C) according to the present invention is featured by a rather low melt flow rate. Accordingly, the polyolefin composition (C) preferably has a melt flow rate $MFR_2$ (230° C.; 2.16 kg) measured according to ISO 1133 in the range of 0.5 to 20 g/10 min, more preferably in the range of 1.0 to 15.0 g/10 min, still more preferably in the range of 1.2 to 10 g/10 min, yet more preferably in the range of 1.5 to 6 g/10 min, like in the range of 2.0 to 4.0 g/10 min.

Further, it is preferred that the polyolefin composition (C) according to the present invention has a xylene cold soluble fraction (XCS) in the range of 20.0 to 80.0 wt.-%, more preferably in the range of 25.0 to 78.0 wt.-%, still more preferably in the range of 35.0 to 75.0 wt.-%, like in the range of 40.0 to 70.0 wt.-%, based on the overall weight of the polyolefin composition (C).

Preferably, the inventive polyolefin composition (C) is a rather soft material. Thus, it is preferred that the polyolefin composition (C) has a flexural modulus determined according to ISO 178 in the range of 30 to 400 MPa, more preferably in the range of 35 to 300 MPa, still more preferably in the range of 40 to 280 MPa, like in the range of 45 to 250 MPa.

Additionally or alternatively to the previous paragraph, it is preferred that the inventive polyolefin composition (C) has a Charpy notched impact strength determined according to ISO 179/1 eA at 23° C. of at least 10 $kJ/m^2$ or even no break, more preferably in the range of 10 to 150 $kJ/m^2$, still more preferably in the range of 15 to 120 $kJ/m^2$, yet more preferably in the range of 20 to 100 $kJ/m^2$, like in the range of 25 to 98 $kJ/m^2$.

As indicated above, it is preferred that the inventive polyolefin composition (C) has excellent optical properties before and after sterilization. Accordingly, it is preferred that the inventive polyolefin composition (C) has a haze before sterilization determined according to ASTM D1003-00 on cast films of 50 μm thickness below 15.0%, more preferably below 12.0%, still more preferably below 10.0%, like below 8.0%, and/or a haze after sterilization determined according to ASTM D1003-00 on cast films of 50 μm thickness below 20.0% more preferably below 18.0%, still more preferably below 17.0%, like below 16.0%.

Further, it is preferred that the polyolefin composition (C) according to the present invention has a glass transition temperature Tg determined by dynamic mechanical analysis according to ISO 6721-7 below −20° C., more preferably in a range of −23 to −45° C., still more preferably in a range of −25 to −40° C., like in a range of −27° C. to −36° C.

In the following, the heterophasic propylene copolymer (TERHECO) and the styrenic thermoplastic elastomer (sTPE) are described in more detail.

The Heterophasic Propylene Copolymer (TERHECO)

The inventive polyolefin composition (C) comprises a heterophasic propylene copolymer (TERHECO) comprising a matrix (M) being a crystalline propylene copolymer (PP) and an elastomeric propylene copolymer (EC) dispersed in said matrix (M) wherein said heterophasic propylene copolymer (TERHECO) consists of units derived from propylene, ethylene and 1-hexene.

Accordingly, the heterophasic propylene copolymer (TERHECO) is a heterophasic system comprising a crystalline matrix (M) being the crystalline propylene copolymer (PP) and a dispersed phase being the elastomeric propylene copolymer (EC). Accordingly, the propylene copolymer (PP) is preferably a (semi)crystalline propylene copolymer (PP) and the elastomeric propylene copolymer (EC) is an elastomeric polymer and the elastomeric propylene copolymer (EC) is (finely) dispersed in the (semi)crystalline propylene copolymer (PP). In other words the (semi)crystalline propylene copolymer (PP) constitutes a matrix in which the elastomeric propylene copolymer (EC) forms inclusions in the matrix, i.e. in the (semi)crystalline propylene copolymer (PP). Thus the matrix contains (finely) dispersed inclusions being not part of the matrix and said inclusions contain the elastomeric propylene copolymer (EC). The term "inclusion" according to this invention shall preferably indicate that the matrix and the inclusion form different phases within the heterophasic propylene copolymer (TERHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the weight ratio between the propylene copolymer (PP) and the elastomeric propylene copolymer (EC) [(PP)/(EC)] within the heterophasic propylene copolymer (TERHECO) is in the range of 90/10 to 55/45, more preferably in the range of 85/15 to 60/40, still more preferably in the range of 82/18 to 65/35.

Further, it is preferred that the overall weight of the propylene copolymer (PP) and the elastomeric propylene copolymer (EC) based on the weight of the heterophasic propylene copolymer (TERHECO) [((PP)+(EC))/(TERHECO)] is at least 80 wt.-%, more preferably at least 90 wt.-%, still more preferably at least 95 wt.-%, like at least 99 wt.-%. It is especially preferred that the heterophasic propylene copolymer (TERHECO) consists of the propylene copolymer (PP) and the elastomeric propylene copolymer (EC).

Additionally or alternatively to the previous paragraph, it is preferred that the heterophasic propylene copolymer (TERHECO) does not contain more than 20 wt.-%, more preferably not more than 10 wt.-%, still more preferably not more than 5 wt.-%, like not more than 1 wt.-% of polymeric components other than the propylene copolymer (PP) and the elastomeric propylene copolymer (EC).

Preferably, the heterophasic propylene copolymer (TERHECO) comprises
i) at least 55 wt.-%, more preferably 55 to 90 wt.-%, still more preferably 60 to 85 wt.-%, like 65 to 82 wt.-% of the propylene copolymer (PP), and
ii) at least 10 wt.-%, more preferably 10 to 45 wt.-%, still more preferably 15 to 40 wt.-%, like 18 to 35 wt.-% of the elastomeric propylene copolymer (EC),
based on the overall weight of the heterophasic propylene copolymer (TERHECO).

Further, the heterophasic propylene copolymer (TERHECO) may contain additives (AD).

The heterophasic propylene copolymer (TERHECO) consists of units derived from propylene, ethylene and 1-hexene.

In particular, the 1-hexene content of the heterophasic propylene copolymer (TERHECO) is in the range of 1.0 to 12.0 wt.-%, preferably in the range of 2.0 to 10.0 wt.-%, more preferably in the range of 2.5 to 8.0 wt.-%, still more preferably in the range of 3.0 to 6.0 wt.-%, like in the range of 4.0 to 5.0 wt.-%, based on the weight of the heterophasic propylene copolymer (TERHECO).

Further, the ethylene content of the heterophasic propylene copolymer (TERHECO) is in the range of 0.1 to 12.0 wt.-%, preferably in the range of 0.1 to 6.0 wt.-%, more preferably in the range of 0.2 to 5.0 wt.-%, still more preferably in the range of 0.3 to 4.0 wt.-%, yet more preferably in the range of 0.4 to 3.5 wt.-%, like in the range of 0.5 to 3.0 wt.-%, based on the weight of the heterophasic propylene copolymer (TERHECO).

Preferably the weight ratio between the 1-hexene content and the ethylene content of the heterophasic propylene copolymer (TERHECO) [(C6) total/(C2) total] is in the range of 1.2 to 12.0, more preferably in the range of 1.3 to 9.0, still more preferably in the range of 1.4 to 8.5, like in the range of 1.5 to 8.0.

The xylene cold soluble fraction (XCS) of the heterophasic propylene copolymer (TERHECO) is in the range of 12 to 45 wt.-%, preferably in the range of 12 to 40 wt.-%, more preferably in the range of 14 to 39 wt.-%, still more preferably in the range of 16 to 38 wt.-%, yet more preferably in the range of 18 to 36 wt.-%, like in the range of 20 to 35 wt.-%, based on the overall weight of the heterophasic propylene copolymer (TERHECO).

It is preferred that the heterophasic propylene copolymer (TERHECO) comprises a certain amount of <2,1> erythro regiodefects. In particular, it is preferred that the heterophasic propylene copolymer (TERHECO) has a content of <2,1> erythro regiodefects as determined from $^{13}$C-NMR of more than 0.0 mol-%, more preferably in a range of 0.01 to 2.5 mol-%, still more preferably in a range of 0.1 to 2.0 mol-%. Accordingly, it is preferred that the heterophasic propylene copolymer (TERHECO) is obtained in the presence of a metallocene catalyst. The metallocene catalyst is described in more detail below.

Preferably, the heterophasic propylene copolymer (TERHECO) has a melting temperature in the range of 125 to 155° C., more preferably in the range of 125 to 140° C., still more preferably in the range of 128 to 137° C., like in the range of 130 to 135° C.

Further, it is preferred that the heterophasic propylene copolymer (TERHECO) has a rather low melt flow rate. In particular, it is preferred that the heterophasic propylene copolymer (TERHECO) has a melt flow rate $MFR_2$ (230° C.; 2.16 kg) measured according to ISO 1133 in the range of 0.5 to 20 g/10 min, more preferably in the range of 1.0 to 15 g/10 min, still more preferably in the range of 1.5 to 10 g/10 min, yet preferably in the range of 1.5 to 8.0 g/10 min, like in the range of 1.8 to 3.5 g/10 min.

The xylene cold soluble fraction (XCS) of the heterophasic propylene copolymer (TERHECO) preferably has a 1-hexene content in the range of 1.0 to 8.0 wt.-%, more preferably in the range of 1.1 to 6.0 wt.-%, more preferably in the range of 1.3 to 5.5 wt.-%, still more preferably in the range of 1.4 to 5.0 wt.-%, like in the range of 1.5 to 4.2 wt.-%.

Additionally or alternatively to the previous paragraph, it is preferred that the xylene cold soluble fraction (XCS) of the heterophasic propylene copolymer (TERHECO) has an ethylene content in the range of 3.0 to 30.0 wt.-%, more preferably in the range of 3.0 to 18.0 wt.-%, still more preferably in the range of 4.0 to 14.0 wt.-%, like in the range of 4.5 to 12.0 wt.-%.

Preferably, the weight ratio between the 1-hexene content of the heterophasic propylene copolymer (TERHECO) and the 1-hexene content of the xylene cold soluble fraction (XCS) of the heterophasic propylene copolymer (TERHECO) [(C6) total/(C6) XCS] is in the range of more than 1.0 to 5.0, more preferably in the range of 1.1 to 4.0, still more preferably in the range of 1.1 to 3.5, like in the range of 1.1 to 3.0.

Additionally or alternatively to the previous paragraph, it is preferred that the weight ratio between the ethylene content and the 1-hexene content of the xylene cold soluble fraction (XCS) of the heterophasic propylene copolymer (TERHECO) [(C2) XCS/(C6) XCS] is in the range of 1.2 to 10.0, more preferably in the range of 1.2 to 9.0, still more preferably in the range of 1.2 to 8.0, like in the range of 1.2 to 7.5.

Preferably, the ethylene and 1-hexene content together of the heterophasic propylene copolymer (TERHECO) is in the range of 1.2 to 12.0 wt.-%, more preferably in the range of 2.0 to 9.0 wt.-%, still more preferably in the range of 3.5 to 8.5, like in the range of 5.0 to 7.5 wt.-%, based on the weight of the heterophasic propylene copolymer (TERHECO), and preferably (a) the 1-hexene content of the heterophasic propylene copolymer (TERHECO), based on the weight of the heterophasic propylene copolymer (TERHECO), is in the range of 2.0 to 7.0 wt.-%, more preferably in the range of 3.0 to 6.0 wt.-%, still more preferably in the range of 4.0 to 5.0 wt.-%, and/or the ethylene content of the heterophasic propylene copolymer (TERHECO), based on the weight of the heterophasic propylene copolymer (TERHECO), is in the range of 0.2 to 4.0 wt.-% more preferably in the range of 0.3 to 3.8 wt.-%, still more preferably in the range of 0.5 to 3.0 wt.-%, and/or (b) the weight ratio between the 1-hexene content and the ethylene content of the heterophasic propylene copolymer (TERHECO) [(C6) total/(C2) total] is in the range of 1.2 to 10.0, more preferably in the range of 1.3 to 9.0, still more preferably in the range of 1.4 to 8.5, like in the range of 1.5 to 8.0.

Further, it is preferred that the ethylene and 1-hexene content together of the xylene cold soluble fraction of the heterophasic propylene copolymer (TERHECO), based on the weight of xylene cold soluble fraction (XCS) of the heterophasic propylene copolymer (TERHECO), is in the range of 5.0 to 30.0 wt.-% more preferably in the range of 5.0 to 20.0 wt.-%, still more preferably in the range of 7.0 to 18.0 wt.-%, like in the range of 8.0 to 14.0 wt.-%, and preferably (a) the 1-hexene content of the xylene cold soluble fraction (XCS) of the heterophasic propylene copolymer (TERHECO), based on the weight of the xylene cold soluble fraction (XCS) of the heterophasic propylene copolymer (TERHECO), is in the range of 1.1 to 6.0 wt.-%, more preferably in the range of 1.3 to 5.0 wt.-%, still more preferably in the range of 1.4 to 4.5 wt.-%, like in the range of 1.5 to 4.2 wt.-%, and/or the ethylene content of the xylene cold soluble fraction (XCS) of the heterophasic propylene copolymer (TERHECO), based on the weight of the xylene cold soluble fraction (XCS) of the heterophasic propylene copolymer (TERHECO), is in the range of 3.0 to 15.0 wt.-%, more preferably in the range of 3.5 to 13.0 wt.-%, still more preferably in the range of 4.0 to 12.5 wt.-%, like in the range of 4.8 to 11.8 wt.-%, and/or (b) the weight ratio between the ethylene content and the 1-hexene content of the xylene cold soluble fraction (XCS) of the heterophasic propylene copolymer (TERHECO) [(C2) XCS/(C6) XCS] is in the range of 1.2 to 10.0, more preferably in the range of 1.2 to 9.0, still more preferably in the range of 1.2 to 8.0, like in the range of 1.2 to 7.5.

Additionally or alternatively, it is preferred that the weight ratio between the ethylene content of the xylene cold soluble fraction (XCS) of the heterophasic propylene copolymer (TERHECO) and the ethylene content of the heterophasic propylene copolymer (TERHECO) [(C2) XCS/(C2) total] is in the range of 2.0 to 20.0, more preferably in the range of 2.5 to 18.0, still more preferably in the range of 3.0 to 16.0, like in the range of 4.0 to 15.5.

Further, it is appreciated that the xylene cold soluble (XCS) fraction of the heterophasic propylene copolymer (TERHECO) is specified by its intrinsic viscosity (IV). A low intrinsic viscosity (IV) value reflects a low weight average molecular weight. In particular, it is preferred that the intrinsic viscosity (IV) of the xylene cold soluble fraction (XCS) of the heterophasic propylene copolymer (TERHECO) measured according to DIN ISO 1628/1 (in decaline at 135° C.) is in the range of 1.2 to 3.5 dl/g, more preferably in the range of 1.5 to 3.2 dl/g, still more preferably in the range of 1.8 to 2.8 dl/g, like in the range of 2.0 to 2.7 dl/g.

The matrix (M) of the heterophasic propylene copolymer (TERHECO) is the propylene copolymer (PP).

It is preferred that the matrix (M) being the propylene copolymer (PP) has a melt flow rate $MFR_2$ (2.16 kg, 230° C.) determined according to ISO 1133 in the range of 0.1 to 25 g/10 min, more preferably in the range of 0.5 to 20 g/10 min, still more preferably in the range of 0.8 to 15 g/10 min, yet more preferably in the range of 1.0 to 10 g/10 min, most preferably in the range of 1.5 to 4.5 g/10 min.

According to one embodiment of the present invention, the matrix (M) being the propylene copolymer (PP) is a crystalline propylene copolymer (C3/C6-PP) consisting of units derived from propylene and 1-hexene preferably having a 1-hexene content, based on the weight of the crystalline propylene copolymer (C3/C6-PP), in the range of 2.0 to 8.0 wt.-%, more preferably in the range of 3.0 to 7.0 wt.-%, still more preferably in the range of 4.0 to 6.0 wt.-%, like in the range of 4.5 to 5.5 wt-.%.

According to another embodiment of the present invention, the matrix (M) being the propylene copolymer (PP) is a crystalline propylene terpolymer (C3/C2/C6) consisting of units derived from of propylene, ethylene and 1-hexene preferably having i) an ethylene content, based on the weight of the crystalline propylene terpolymer (C3/C2/C6), in the range of 0.1 to 2.0 wt.-%, more preferably in the range of 0.2 to 1.5 wt.-%, still more preferably in the range of 0.5 to 1.2 wt.-%, like in the range of 0.6 to 0.9 wt.-%, and ii) a 1-hexene content, based on the weight of the crystalline propylene terpolymer (C3/C2/C6), in the range of 0.5 to 6.0 wt.-%, more preferably in the range of 2.0 to 5.8 wt.-%, still more preferably in the range of 3.0 to 5.7 wt.-%, like in the range of 4.5 to 5.5 wt.-%.

The elastomeric propylene copolymer (EC) being the dispersed phase of the heterophasic propylene copolymer (TERHECO) preferably consists of units derived from propylene and ethylene.

The heterophasic propylene copolymer (TERHECO) can be produced by blending the propylene copolymer (PP) and the elastomeric propylene copolymer (EC). However, it is preferred that the heterophasic propylene copolymer (TERHECO) is produced in a sequential step process, using reactors in serial configuration and operating at different reaction conditions. As a consequence, each fraction prepared in a specific reactor may have its own molecular weight distribution and/or comonomer content distribution.

Accordingly, it is preferred that the heterophasic propylene copolymer (TERHECO) is produced in a sequential polymerization process comprising the steps of (a) polymerizing propylene, 1-hexene and optionally ethylene in a first reactor (R1) obtaining a first polypropylene fraction of the propylene copolymer (PP), (b) transferring the first polypropylene fraction into a second reactor (R2), (c) polymerizing in the second reactor (R2), 1-hexene and optionally ethylene, obtaining thereby a second polypropylene fraction, said first polypropylene fraction and said second polypropylene fraction form the propylene copolymer (PP), i.e. the matrix (M) of the heterophasic propylene copolymer (TERHECO), (d) transferring the propylene copolymer (PP) of step (c) into a third reactor (R3), (e) polymerizing in the third reactor (R3) and in the presence of the propylene copolymer (PP) obtained in step (c) propylene and ethylene to obtain the elastomeric propylene copolymer (EC) dispersed in the propylene copolymer (PP), the propylene copolymer (PP) and the elastomeric propylene copolymer (EC) form the heterophasic propylene copolymer (TERHECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

The term "sequential polymerization process" indicates that the heterophasic propylene copolymer (TERHECO) is produced in at least two, like three reactors connected in series. Accordingly, the present process comprises at least a first reactor (R1) and a second reactor (R2), more preferably a first reactor (R1), a second reactor (R2) and a third reactor (R3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactor (GPR). Accordingly for the instant process at least three, preferably three polymerization reactors, namely two slurry reactors (SR), like two loop reactors (LR), and one gas phase reactors (GPR) connected in series are used. If needed prior to the first slurry reactor (SR) a pre-polymerization reactor is placed.

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (TERHECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 62 and 80° C., the pressure is within the range of 20 bar to 80 bar, preferably between 30 bar to 60 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 13 bar to 35 bar, hydrogen can be added for controlling the molar mass in a manner known per se.

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

Subsequently, the reaction mixture from step (c) is transferred into the third reactor (R3), i.e. gas phase reactor (GPR-2). The conditions and residence times in reactor (R3) are preferably identical with the conditions and residence times in reactor (R2) as outlined in the previous paragraphs.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 80 bar, for example 30 to 60 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (TERHECO) is obtained by a multistage polymerization process, as described above, in the presence of a catalyst system comprising a metallocene catalyst.

In particular, the catalyst system as used in the present invention includes a catalyst component according to formula (I)

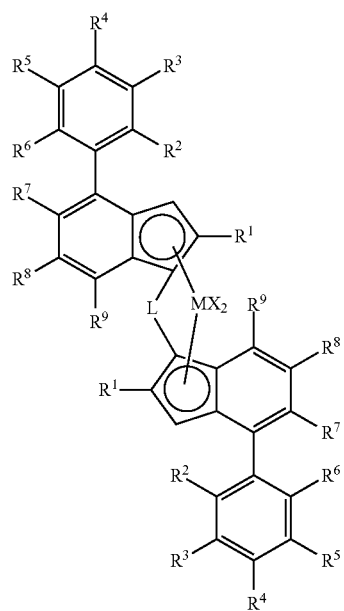

(I)

wherein
M is zirconium or hafnium;
each X independently is a sigma-donor ligand
L is a bridge of formula -(ER$^{10}_2$)$_y$—;
y is 1 or 2;
E is C or Si;
each R$^{10}$ is independently a C$_1$-C$_{20}$-hydrocarbyl group, tri(C$_1$-C$_{20}$ alkyl)silyl group, C$_6$-C$_{20}$ aryl group, C$_7$-C$_{20}$ arylalkyl group or C$_7$-C$_{20}$ alkylaryl group or L is an alkylene group such as methylene or ethylene;
R$^1$ are each independently the same or are different from each other and are a CH$_2$—R$^{11}$ group, with R$^{11}$ being H or linear or branched C$_1$-C$_6$ alkyl group, C$_3$-C$_8$ cycloalkyl group, C$_6$-C$_{10}$ aryl group;
R$^3$, R$^4$ and R$^5$ are each independently the same or different from each other and are H or a linear or branched C$_1$-C$_6$ alkyl group, C$_7$-C$_{20}$ arylalkyl group, C$_7$-C$_{20}$ alkylaryl group, or C$_6$-C$_{20}$ aryl group with the proviso that if there are four or more R$^3$, R$^4$ and R$^5$ groups different from H present in total, one or more of R$^3$, R$^4$ and R$^5$ is other than tert butyl;
R$^7$ and R$^8$ are each independently the same or different from each other and are H, a CH$_2$—R$^{12}$ group, with R$^{12}$ being H or linear or branched C$_1$-C$_6$ alkyl group, SiR$^{13}_3$, GeR$^{13}_3$, OR$^{13}$, SR$^{13}$, NR$^{13}_2$,
wherein
R$^{13}$ is a linear or branched C$_1$-C$_6$ alkyl group, C$_7$-C$_{20}$ alkylaryl group and C$_7$-C$_{20}$ arylalkyl group or C$_6$-C$_{20}$ aryl group.

The catalyst system may include also
(ii) a cocatalyst system comprising a boron containing cocatalyst and an aluminoxane cocatalyst.

It should be stressed that, in some instances the use of such cocatalyst may not be required.

The catalyst system of the invention can be used in non-supported form or in solid form.

The catalyst system of the invention may be used as a homogeneous catalyst system or heterogeneous catalyst system.

The catalyst system of the invention in solid form, preferably in solid particulate form can be either supported on an external carrier material, like silica or alumina, or, in a particularly preferred embodiment, is free from an external carrier, however still being in solid form. For example, the solid catalyst system is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Particular complexes of the invention include:
Rac-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Race-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, and
Rac-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl.

The catalysts have been described inter alia in WO2015/011135 which is incorporated by reference herewith. A particularly preferred catalyst is catalyst number 3 of WO2015/011135. The preparation of the metallocenes has been described in WO2013/007650 which is incorporated by reference herewith. The complex preparation of the particular preferred catalyst has been described as E2 in WO2013/007650.

For the avoidance of doubt, any narrower definition of a substituent offered above can be combined with any other broad or narrowed definition of any other substituent. Throughout the disclosure above, where a narrower definition of a substituent is presented, that narrower definition is deemed disclosed in conjunction with all broader and narrower definitions of other substituents in the application.

The ligands required to form the complexes and hence catalysts/catalyst system of the invention can be synthesized by any process and the skilled organic chemist would be able to devise various synthetic protocols for the manufacture of the necessary ligand materials. For Example WO 2007/116034 discloses the necessary chemistry. Synthetic protocols can also generally be found in WO 2002/02576, WO 2011/135004, WO 2012/084961, WO 2012/001052, WO 2011/076780 and WO 2015/158790. The examples section also provides the skilled person with sufficient direction.

As stated above a cocatalyst is not always required. However, when used, the cocatalyst system comprises a boron containing cocatalyst as well as an aluminoxane cocatalyst. The aluminoxane cocatalyst can be one of formula (X):

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention the aluminoxane cocatalyst is used in combination with a boron containing cocatalyst, i.e. when a cocatalyst system or a cocatalyst is present, which is usually not required.

Boron based cocatalysts of interest include those of formula (Z)

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane. Particular preference is given to tris(pentafluorophenyl)borane.

Borates can be used, i.e. compounds containing a borate 3+ ion. Such ionic cocatalysts preferably contain a non-coordinating anion such as tetrakis(pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate or
N,N-dimethylbenzylammoniumtetrakis(pentafluorophenyl)borate.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The Styrenic Thermoplastic Elastomer (sTPE)

The additional required component in the present invention is a styrenic thermoplastic elastomer (sTPE). This additional component may be dispersed in the heterophasic propylene copolymer (TERHECO).

Preferably the styrenic thermoplastic elastomer (sTPE) can be a styrene-ethylene/butylene-styrene (SEBS) block copolymer (B-1) and/or a hydrogenated styrene-vinyl isoprene (SIS) block rubber (B-2).

It is especially preferred that the styrenic thermoplastic elastomer (sTPE) is a styrene-ethylene/butylene-styrene (SEBS) block copolymer (B-1).

Accordingly it is appreciated that the styrenic thermoplastic elastomer (sTPE), preferably the styrene-ethylene/butylene-styrene (SEBS) block copolymer (B-1) and/or the hydrogenated styrene-vinyl isoprene (SIS) block rubber (B-2), preferably has (have) a styrene content in the range of 5.0 to 40.0 wt.-%, more preferably in the range of 8.0 to 20.0 wt.-%, still more preferably in the range of 10.0 to 15.0 wt.-%, like in the range of 11.0 to 13.0 wt.-%.

Further it is appreciated that the styrenic thermoplastic elastomer (sTPE), preferably the styrene-ethylene/butylene-styrene (SEBS) block copolymer (B-1) and/or the hydrogenated styrene-vinyl isoprene (SIS) block rubber (B-2), has (have) a moderate melt flow rate $MFR_2$ (230° C.), i.e. preferably in the range of 0.5 to 10.0 g/10 min, more preferably in the range of 1.0 to 6.0 g/10 min, still more preferably in the range of 1.5 to 4.0 g/10 min, like in the range of 1.8 to 3.0 g/10 min.

Further the styrenic thermoplastic elastomer (sTPE), preferably the styrene-ethylene/butylene-styrene (SEBS) block copolymer (B-1) and/or the hydrogenated styrene-vinyl isoprene (SIS) block rubber (B-2), may be defined by its density. Thus it is appreciated that the styrenic thermoplastic elastomer (sTPE), preferably the styrene-ethylene/butylene-styrene (SEBS) block copolymer (B-1) and/or the hydrogenated styrene-vinyl isoprene (SIS) block rubber (B-2), has (have) a density of equal or below 0.905 $g/cm^3$, more preferred in the range of 0.850 to 0.905 $g/cm^3$.

Additionally or alternatively the styrenic thermoplastic elastomer (sTPE), preferably the styrene-ethylene/butylene-styrene (SEBS) block copolymer (B-1) and/or the hydrogenated styrene-vinyl isoprene (SIS) block rubber (B-2), can be defined by the Shore A hardness. Thus it is appreciated that the styrenic thermoplastic elastomer (sTPE), preferably the styrene-ethylene/butylene-styrene (SEBS) block copolymer (B-1) and/or the hydrogenated styrene-vinyl isoprene (SIS) block rubber (B-2), has/have a Shore A hardness measured according to ASTM D 2240 from 25 to 70, preferably from 30 to 60.

The Additives (AD)

In addition the heterophasic propylene copolymer (TERHECO) and the styrenic thermoplastic elastomer (sTPE) the polyolefin composition (C) of the invention may include additives (AD). Typical additives are acid scavengers, anti-oxidants, colorants, light stabilisers, plasticizers, slip agents, anti-scratch agents, dispersing agents, processing aids, lubricants, pigments, nucleating agents, inorganic fillers and the like.

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polyolefin composition (C) of the invention does not comprise (a) further polymer (s) different to heterophasic propylene copolymer (TERHECO) and the styrenic thermoplastic elastomer (sTPE) in an amount exceeding 15 wt.-%, preferably in an amount exceeding 10 wt.-%, more preferably in an amount exceeding 9 wt.-%, based on the weight of the polyolefin composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the polyolefin composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The present invention is also directed to an article comprising the above described polyolefin composition (C), preferably an sterilized article.

The article comprises at least 90 wt.-%, preferably at least 95 wt.-%, more preferably at least 98 wt.-%, still more preferably at least 99 wt.-% of the polyolefin composition (C), based on the overall weight of the article.

It is especially preferred that the article consists of the polyolefin composition (C).

Preferably, the article is a packaging material, more preferably a medial packaging material like a pouch or a (infusion or blood) bag.

The Process

The present invention is also directed to a process wherein an article as described above is produced which is subsequently sterilized.

Preferably, the article is sterilized by means of steam sterilization.

It is preferred that the article has a haze after sterilization determined according to ASTM D1003-00 below 20%, more preferably below 18%, still more preferably below 17%, like below 16%.

The present invention will now be described in further detail by the examples provided below.

EXAMPLES

1. Measuring Methods

The following definitions of terms and determination methods apply for the above general description of the invention as well as to the below examples unless otherwise defined. $MFR_2$ (230° C.) is measured according to ISO 1133 (230° C., 2.16 kg load).

Quantification of Microstructure by NMR Spectroscopy

Comonomer content (ethylene): Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate $(Cr(acac)_3)$ resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}$C {$^1$H}NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}$C {$^1$H} spectra. This method was chosen for its robust nature and ability to account for the presence of regio-defects when needed. Integral regions were slightly adjusted to increase applicability across the whole range of encountered comonomer contents.

Comonomer content (1-hexene): Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382, Parkinson, M., Klimke, K., Spiess, H. W., Wilhelm, M., Macromol. Chem. Phys. 2007; 208:2128, Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207:382., Pollard, M., Klimke, K., Graf, R., Spiess, H. W., Wilhelm, M., Sperber, O., Piel, C., Kaminsky, W., Macromolecules 2004; 37:813). and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H = I\alpha B4/2$$

The amount of 1-hexene incorporated in PHHP double consecutive sequences was quantified using the integral of the ααB4 site at 41.7 ppm accounting for the number of reporting sites per comonomer:

$$HH = 2 * I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H = (I\alpha B4 - 2 * I\alpha\alpha B4)/2$$

The total 1-hexene content was calculated based on the sum of isolated and consecutively incorporated 1-hexene:

$$Htotal = H + HH$$

When no sites indicative of consecutive incorporation observed the total 1-hexeen comonomer content was calculated solely on this quantity:

$$Htotal = H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21 = I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_S\alpha\alpha + 2 * P21 + H + HH/2$$

The total amount of propene was quantified as the sum of primary (1,2) and secondary (2,1-erythro) inserted propene:

$$P_{total} = P12 + P21 = I_S\alpha\alpha + 3*I\alpha\alpha21e9 + (I\alpha B4 - 2*I\alpha\alpha B4)/2 + I\alpha\alpha B4$$

This simplifies to:

$$P_{total} = I_S\alpha\alpha + 3*I\alpha\alpha21e9 + 0.5*I\alpha B4$$

The total mole fraction of 1-hexene in the polymer was then calculated as:

$$fH = H_{total}/(H_{total} + P_{total})$$

The full integral equation for the mole fraction of 1-hexene in the polymer was:

$$fH = (((I\alpha B4 - 2*I\alpha\alpha B4)/2) + (2*I\alpha\alpha B4))/$$
$$((I_S\alpha\alpha + 3*I\alpha\alpha21e9 + 0.5*I\alpha B4) +$$
$$((I\alpha B4 - 2*I\alpha\alpha B4)/2) + (2*I\alpha\alpha B4))$$

This simplifies to:

$$fH = (I\alpha B4/2 + I\alpha\alpha B4)/(I_S\alpha\alpha + 3*I\alpha\alpha21e9 + I\alpha B4 + I\alpha\alpha B4)$$

The total comonomer incorporation of 1-hexene in mole percent was calculated from the mole fraction in the usual manner:

$$H[mol\ \%] = 100 * fH$$

The total comonomer incorporation of 1-hexene in weight percent was calculated from the mole fraction in the standard manner:

$$H[wt\ \%] = 100 * (fH * 84.16)/((fH * 84.16) + ((1 - fH) * 42.08))$$

The styrene content is measured by Fourier transform infrared spectroscopy (FTIR). A thin film of 300 μm thickness is prepared from pelletized material by hot-pressing (190° C., 100 bar, 1 minute). Per sample, two films are prepared. The so prepared film-samples are measured by a Perkin Elmer IR-Spectrophotometer System 2000FTIR. The peak at 1602 $cm^{-1}$ (Phenyl-Absorption) is integrated and evaluated by using an internally established calibration curve. The arithmetic mean of two measurements is given as result.

Calibration: Various polypropylene-compounds consisting of PP and a styrene-containing elastomer (of known styrene-content) are prepared and measured according to the method described above.

Melting Temperature and Degree of Crystallinity

DSC analysis: melting temperature (Tm), crystallization temperature (Tc): measured with a TA Instrument Q2000 differential scanning calorimeter (DSC) on 5 to 7 mg samples. DSC run according to ISO 11357/part 3/method C2 in a heat/cool/heat cycle with a scan rate of 10° C./min in the temperature range of −30 to +230° C. Crystallization temperature was determined from the cooling step, while melting temperature was determined from the heating scan.

Intrinsic viscosity is measured according to DIN ISO 1628/1, October 1999 (in Decalin at 135° C.).

Density is measured according to ISO 1183-187. Sample preparation is done either by compression moulding in accordance with ISO 1872-2:2007 or 10×10×2 mm specimen were cut from injection-moulded parts.

The xylene solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

Flexural Modulus: The flexural modulus was determined in 3-point-bending according to ISO 178 on 80×10×4 $mm^3$ test bars injection molded at 23° C. in line with EN ISO 1873-2.

Charpy notched impact test: The charpy notched impact strength (Charpy NIS) was measured according to ISO 179 2C/DIN 53453 at 23° C. and −20° C., using injection molded bar test specimens of 80×10×4 mm prepared in accordance with ISO 294-1:1996.

The glass transition temperature Tg and the storage modulus G' (23° C.) are determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

Transparency, haze and clarity were determined according to ASTM D1003-00 on 60×60×1 $mm^3$ plaques injection molded in line with EN ISO 1873-2 using a melt temperature of 200° C. and on cast films of 50 μm thickness produced on a monolayer cast film line with a melt temperature of 220° C. and a chill roll temperature of 20° C.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

2. Examples

Preparation of the Catalyst for the Inventive TERHECOs

The catalyst used in the inventive examples is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Polymerization and Pelletization

Polymerization was performed in a Borstar pilot plant comprising a prepolymerization reactor, a loop reactor and two gas phase reactors. The polymerization conditions are indicated in Table 1. The resulting TERHECOs were compounded in a co-rotating twin-screw extruder Coperion ZSK 57 at 220° C. with 0.2 wt % of Irganox B225 (1:1-blend of Irganox 1010 (Pentaerythrityl-5 tetrakis(3-(3',5'-di-tert-.butyl-4-hydroxytoluyl)-propionate and tris (2,4-di-t-butylphenyl) phosphate) phosphite) of BASF AG, Germany) and 0.1 wt % calcium stearate followed by solidification of the resulting melt strands in a water bath and pelletization.

TABLE 1

Preparation of the inventive TERHECOs

|  |  | TERHECO-1 | TERHECO-2 | TERHECO-3 |
|---|---|---|---|---|
| Prepolymerization |  |  |  |  |
| Temperature | [° C.] | 20 | 20 | 20 |
| Catalyst feed | [g/h] | 1.3 | 1.3 | 0.9 |
| TEAL/C3 | [g/t] | 0 | 0 | 0 |
| C3 feed | [kg/h] | 160 | 161 | 171 |
| H2 feed | [hg/h] | 0.7 | 0.7 | 0.7 |
| Residence time | [h] | 0.2 | 0.2 | 0.2 |
| Loop |  |  |  |  |
| Temperature | [° C.] | 70 | 70 | 70 |
| Pressure | [kPa] | 5224 | 5216 | 5237 |
| H2/C3 ratio | [mol/kmol] | 0.10 | 0.10 | 0.09 |
| C6/C3 ratio | [mol/kmol] | 8.0 | 8.0 | 8.0 |
| C2/C3 ratio | [mol/kmol] | 0 | 0 | 8.1 |
| MFR$_2$ | [g/10 min] | 2.0 | 2.0 | 2.0 |
| XCS | [wt.-%] | 0.80 | 0.90 | 0.80 |
| C6 | [wt.-%] | 1.7 | 1.7 | 1.7 |
| C2 | [wt.-%] | — | — | 0.5 |
| Residence time | [h] | 0.50 | 0.50 | 0.50 |
| Split | [wt.-%] | 40 | 38 | 35 |
| GPR1 |  |  |  |  |
| Temperature | [° C.] | 75 | 75 | 75 |
| Pressure | [kPa] | 2400 | 2400 | 2400 |
| H2/C3 ratio | [mol/kmol] | 1.1 | 0.8 | 1.0 |
| C6/C3 ratio | [mol/kmol] | 9.5 | 10.0 | 9.2 |
| C2/C3 ratio | [mol/kmol] | 0 | 0 | 31.4 |
| C6 (GPR1) | [wt.-%] | 5.1 | 5.0 | 5.5 |
| C2 (GPR1) | [wt.-%] | — | — | 0.7 |
| MFR$_2$ (GPR1) | [g/10min] | 3.3 | 1.8 | 2.2 |
| Residence time | [h] | 2.5 | 2.7 | 2.5 |
| XCS | [wt.-%] | 5.2 | 13.9 | 19.3 |
| Split | [wt.-%] | 40 | 35 | 35 |
| GPR2 |  |  |  |  |
| Temperature | [° C.] | 65 | 65 | 65 |
| Pressure | [kPa] | 2500 | 2470 | 2330 |
| H2/C3 ratio | [mol/kmol] | 0 | 0.2 | 0 |
| C6/C3 ratio | [mol/kmol] | 0 | 0 | 0 |
| C2/C3 ratio | [mol/kmol] | 320 | 519 | 278 |
| Residence time | [h] | 1.5 | 1.2 | 1.1 |
| Split | [wt.-%] | 20 | 27 | 30 |

TABLE 2

Properties of the inventive TERHECOs

|  |  | TERHECO-1 | TERHECO-2 | TERHECO-3 |
|---|---|---|---|---|
| MFR | [g/10 min] | 3.2 | 1.9 | 1.9 |
| C2 (total) | [wt.-%] | 0.6 | 2.8 | 0.9 |
| C6 (total) | [wt.-%] | 4.7 | 4.3 | 4.7 |
| C2 (XCS) | [wt.-%] | 9.9 | 11.4 | 4.9 |
| C6 (XCS) | [wt.-%] | 1.9 | 1.6 | 4.1 |
| XCS | [wt.-%] | 20.8 | 34.2 | 29.8 |
| IV (XCS) | [dl/g] | 2.1 | 2.0 | 2.7 |
| 1,2 regio defects | [mol-%] | 0.6 | 0.6 | 0.7 |
| Tm | [° C.] | 132 | 135 | 130 |
| Tc | [° C.] | 94 | 94 | 92 |
| Hm | [J/g] | 59 | 48 | 58 |
| Tg1 | [° C.] | −1.8 | −1.1 | −2.0 |
| Tg2 | [° C.] | nd | −22.4 | nd |
| G' | [MPa] | 286 | 239 | 287 |
| NIS (23° C.) | [kJ/m$^2$] | 6.4 | 62.2 | 6.7 |
| NIS (−20° C.) | [kJ/m$^2$] | 1.6 | 3.0 | 1.8 |
| Flex. Modulus | [MPa] | 551 | 383 | 550 |
| Haze | [%] | 21 | 14 | 25 |
| Clarity | [%] | 98.9 | 98.5 | 98.3 | nd not determined

The inventive TERHECOs were subsequently compounded with the styrenic thermoplastic elastomer (sTPE) in amounts as indicated in Table 3 in order to obtain the polyolefin composition (C).

PP-Polymer is a random heterophasic copolymer of propylene and ethylene as disclosed in table 1 of WO 2018/185024 having a melt flow rate of 4.9 g/10 min, a xylene cold soluble (XCS) content of 20.5 wt.-% and an ethylene content of 9.2 wt.-%.

SEBS is the commercial styrene-ethylene/styrene-butylene block copolymer Kraton G 1645M supplied by Kraton Polymers LLC having a styrene content of 12.5 wt.-%, a Shore A hardness of 35, a melt flow rate (230° C.) of 2.0 g/10 min and a density of 0.900 g/cm$^3$.

TABLE 3

Properties of the inventive and comparative compositions (C)

|  |  | IE1 | IE2 | IE3 | IE4 | IE5 | CE1 |
|---|---|---|---|---|---|---|---|
| TERHECO-1 | [wt.-%] | 75 | 50 |  |  |  |  |
| TERHECO-2 | [wt.-%] |  |  | 50 | 75 |  |  |
| TERHECO-3 | [wt.-%] |  |  |  |  | 75 |  |
| PP-Polymer | [wt.-%] |  |  |  |  |  | 75 |
| SEBS | [wt.-%] | 25 | 50 | 50 | 25 | 25 | 25 |

TABLE 3-continued

Properties of the inventive and comparative compositions (C)

| | | IE1 | IE2 | IE3 | IE4 | IE5 | CE1 |
|---|---|---|---|---|---|---|---|
| MFR | [g/10 min] | 3.4 | 3.5 | 2.7 | 2.3 | 2.3 | 4.2 |
| XCS | [wt.-%] | 42.8 | 62.1 | 69.4 | 52.7 | 49.6 | 39.0 |
| Flex. Modulus | [MPa] | 245 | 68 | 51 | 170 | 221 | 219 |
| NIS (23° C.) | [kJ/m$^2$] | 85.6 | 68.5 | 26.6 | 97.7 | 96.8 | 95.6 |
| NIS (−20° C.) | [kJ/m$^2$] | 1.7 | 118.5 | 59.4 | 1.9 | 1.6 | 3.5 |
| Haze b.s. | [%] | 6.6 | 4.7 | 4.6 | 5.8 | 7.7 | 27.0 |
| Haze a.s. | [%] | 10.1 | 11.6 | 15.8 | 14.4 | 13.3 | 45.4 |
| G' | [MPa] | 157.0 | 31.8 | 23.7 | 117.0 | 145.0 | 144.0 |
| Tg1 | [° C.] | −0.3 | n.d | n.d | −0.9 | −1.5 | −6.5 |
| Tg2 | [° C.] | −35.2 | −28.0 | −28.1 | −34.0 | −34.1 | −31.2 |

As can be gathered from Table 3, the inventive compositions comprising a heterophasic propylene copolymer (TERHECO) consisting of ethylene, propylene and 1-hexene units show lower haze values before and after sterilization compared to a composition comprising a heterophasic propylene copolymer which does not contain any 1-hexene units.

The invention claimed is:

1. A polyolefin composition (C) comprising:
   (a) a heterophasic propylene copolymer (TERHECO) comprising:
      (a1) a matrix (M) being a crystalline propylene copolymer (P); and
      (a2) an elastomeric propylene copolymer (EC) dispersed in said matrix (M), the heterophasic propylene copolymer (TERHECO) consisting of units derived from propylene, ethylene and 1-hexene;
   and
   (b) a styrenic thermoplastic elastomer (sTPE) having a Shore A hardness measured according to ASTM D 2240 from 25 to 70;
   wherein
   (i) a weight ratio between the heterophasic propylene copolymer (TERHECO) and the styrenic thermoplastic elastomer (sTPE) [(TERHECO)/(sTPE)] is in a range of 30/70 to 90/10;
   (ii) an overall weight of the heterophasic propylene copolymer (TERHECO) and the styrenic thermoplastic elastomer (sTPE) based on a weight of the composition (C) [((TERHECO)+(sTPE))/(C)] is at least 80 wt. %;
   (iii) the 1-hexene content, based on a weight of the heterophasic propylene copolymer (TERHECO), is in a range of 1.0 to 12.0 wt. %;
   (iv) the ethylene content, based on the weight of the heterophasic propylene copolymer (TERHECO), is in a range of 0.1 to 12.0 wt. %;
   (v) the xylene cold soluble fraction (XCS) of the heterophasic propylene copolymer (TERHECO) is in a range of 12 to 45 wt. %; and
   (vi) the heterophasic propylene copolymer (TERHECO) is obtained in the presence of a metallocene catalyst and has a content of <2,1> erythro regiodefects as determined from $^{13}$C-NMR of more than 0.0 mol-%.

2. The polyolefin composition (C) according to claim 1 having
   (a) a melt flow rate MFR$_2$ (230° C.; 2.16 kg) measured according to ISO 1133 in a range of 0.5 to 20 g/10 min; and/or
   (b) a glass transition temperature Tg below −20° C.

3. The polyolefin composition (C) according to claim 1, wherein the heterophasic propylene copolymer (TERHECO) has a melting temperature in the range of 125 to 140° C.

4. The polyolefin composition (C) according to claim 1, wherein
   (a) a weight ratio between the 1-hexene content and the ethylene content of the heterophasic propylene copolymer (TERHECO) [(C6) total/(C2) total] is in the range of 1.2 to 12.0;
   and/or
   (b) a weight ratio between the ethylene content and the 1-hexene content of the xylene cold soluble fraction (XCS) of the heterophasic propylene copolymer (TERHECO) [(C2) XCS/(C6) XCS] is in the range of 1.2 to 10.0.

5. The polyolefin composition (C) according to claim 1, wherein the heterophasic propylene copolymer (TERHECO) has
   (a) a melt flow rate MFR$_2$ (230° C.; 2.16 kg) measured according to ISO 1133 in the range of 0.5 to 20 g/10 min;
   and/or
   (b) an ethylene content, based on the weight of the heterophasic propylene copolymer (TERHECO), is in the range of 0.1 to 6.0 wt. %.

6. The polyolefin composition (C) according to claim 1, wherein the matrix (M) is
   (a) a crystalline propylene copolymer (C3/C6-PP) consisting of units derived from propylene and 1-hexene, or
   (b) a crystalline propylene terpolymer (C3/C2/C6) consisting of units derived from of propylene, ethylene and 1-hexene.

7. The polyolefin composition (C) according to e claim 1, wherein the elastomeric propylene copolymer (EC) consists of units derived from propylene and ethylene.

8. The polyolefin composition (C) according to claim 1, wherein the xylene cold soluble fraction (XCS) of the heterophasic propylene copolymer (TERHECO) has
   (a) a 1-hexene content in the range of 1.0 to 8.0 wt. %; and/or
   (b) an ethylene content in the range of 3.0 to 18.0 wt. %; and/or
   (a) an intrinsic viscosity (IV) measured according to DIN ISO 1628/1 (in decaline at 135° C.) in the range of 1.2 to 2.5 dl/g.

9. The polyolefin composition (C) according to claim 1, wherein the ethylene and 1-hexene content together of the heterophasic propylene copolymer (TERHECO), based on the weight of the heterophasic propylene copolymer (TERHECO), is in the range of 1.2 to 10.0 wt. %.

10. The polyolefin composition (C) according to e claim 1, wherein the ethylene and 1-hexene content together of the xylene cold soluble fraction of the heterophasic propylene copolymer (TERHECO), based on the weight of xylene cold soluble fraction (XCS) of the heterophasic propylene copolymer (TERHECO), is in the range of 5.0 to 20.0 wt. %.

11. The polyolefin composition (C) according to e claim 1, wherein,
    (a) the weight ratio between the 1-hexene content of the heterophasic propylene copolymer (TERHECO) and the 1-hexene content of the xylene cold soluble fraction (XCS) of the heterophasic propylene copolymer (TERHECO) [(C6) total/(C6) XCS] is in the range of more than 1.0 to 5.0; and/or
    (b) the weight ratio between the ethylene content of the xylene cold soluble fraction (XCS) of the heterophasic propylene copolymer (TERHECO) and the ethylene content of the heterophasic propylene copolymer (TERHECO) [(C2) XCS/(C2) total] is in the range of 2.0 to 20.0.

12. The polyolefin composition (C) according to claim 1, wherein the styrenic thermoplastic elastomer (sTPE) has
   (a) a melt flow rate MFR$_2$ (230° C.; 2.16 kg) measured according to ISO 1133 in the range of 0.5 to 10 g/10 min;
   and/or
   (b) a styrene content, based on the weight of the styrenic thermoplastic elastomer (sTPE), in the range of 5 to 40 wt. %.

13. The polyolefin composition (C) according to claim 1, wherein the styrenic thermoplastic elastomer (sTPE) is a styrene-ethylene/butylene-styrene block copolymer (SEBS).

14. An article comprising at least 90 wt. %, based on the weight of the article, the polyolefin composition (C) according claim 1.

15. A process comprising the steps of
   (a) producing an article according to claim 14, and
   (b) sterilizing the article.

16. The polyolefin composition (C) according to claim 1, wherein the heterophasic propylene copolymer (TERHECO) has a content of <2,1> erythro regiodefects as determined from $^{13}$C-NMR in the range of 0.1 to 2.0 mol-%.

* * * * *